United States Patent Office

2,956,861
Patented Oct. 18, 1960

2,956,861

PROCESS FOR THE PREPARATION OF HIGHLY DISPERSED METALLIC OXIDES, PARTICULARLY ZINC OXIDE

Robert Garlet, Toulouse, France, assignor to Office National Industriel de l'Azote, Toulouse, France No Drawing. Filed June 26, 1956, Ser. No. 593,803

Claims priority, application France July 1, 1955

9 Claims. (Cl. 23—147)

The present invention relates to a process for the preparation of certain metallic oxides, and especially zinc oxide, in a highly dispersed state. In a broader aspect, all the oxides of metals of the second group of the periodic system of classification of the elements, and especially MgO and CdO, the carbonates of which decompose at relatively low temperature, as well as certain oxides of metals of other groups, such as lead monoxide, can be treated according to the process of the present invention, as hereinafter described, in order to obtain very active absorbent masses.

Various methods for the preparation of active zinc oxide have already been proposed. Certain of these methods consist in precipitating the hydroxide or hydrous carbonate from an aqueous solution of a zinc salt by means of sodium carbonate. The major disadvantage of these prior processes resides in the great difficulty of washing the obtained precipitate.

Other proposed methods involve the direct reaction of carbon dioxide on commercial zinc oxide in aqueous suspension. This reaction is carried out under atmospheric pressure or, preferably, in an autoclave under high pressure. Upon conclusion of the reaction, the obtained suspension of hydrous carbonate is filtered or centrifuged, and the product is dehydrated and decarbonated by heating at a temperature above 130° C. The disadvantages of this type of process reside in the fact that at atmospheric pressure the reaction is slow and requires a large excess of $CO_2$ and that at elevated pressure it requires the employment of an inconvenient apparatus. Moreover, the filtration is a long and costly operation.

A primary object of the present invention is to embody a procedure for the preparation of zinc oxide, which is free of the defects and disadvantages of the several prior known processes. This object is realized by the expedient, according to the present invention, of treating commercial zinc oxide, in the pasty state and at atmospheric pressure, in a mixing machine with ammonium carbonate, in the presence or absence of carbon dioxide. Alternatively, carbon dioxide may be injected into a stirred pasty mixture of commercial zinc oxide and ammonia.

According to the present invention, the ammonia liberated by displacement thereof from the ammonium carbonate by means of the zinc oxide, or added to the zinc oxide in the form of an aqueous solution in order to convert the latter into paste form, acts as a carbonatation catalyst and results in a considerable acceleration of the reaction, even at atmospheric pressure. The employment of the readily-decomposable ammonium carbonate eliminates any necessity for washing the carbonated product, the said washing operation being indispensable when sodium carbonate is employed as precipitating agent. Finally, the fact that the carbonatation reaction is carried out in the pasty phase makes it possible to obviate the disadvantages due to the filtration or centrifugation.

At the end of the operation, the paste is sufficiently plastic to be subjected to desired ultimate configuration.

The moist product, if then exposed to air, hardens by a setting action due to atmospheric carbon dioxide and to the catalytic action of the ammonia still present in the finished product. The product may be definitively dried in air or stoved.

The product containing zinc carbonate and hydrous zinc carbonate prepared according to the invention is forthwith suitable to be fed to gas desulfurization apparatus. The used mass can, after calcination and comminution, be re-used as starting material in the process of the present invention, and yields a product of an efficiency comparable to that obtained when starting with commercial zinc oxide.

If the product is intended for use in the rubber industry where it is employed as a charge and vulcanization accelerator, or in the pigment industry, it is necessary to decompose the zinc carbonate and hydrous zinc carbonate present by heating and comminuting the product obtained to the requisite fineness to get pure zinc oxide.

The process according to the present invention yields a product of high activity. The simplicity of the process makes it possible to arrest the evolution and the process at any desired stage. The following examples, illustrating the zinc oxide phase of the invention, relate to the utilization of the product in the desulfurization of gas.

A further object is to embody a corresponding procedure whereby highly dispersed oxides of other metals, especially those of the second group of the periodic system, and particularly MgO and CdO, can also be prepared. (In this connection, the second group metals comprise Be, Mg, Ca, Sr, Ba, Ra, Zn, Cd, Hg.)

In the following illustrative examples, percentages are by weight; temperatures are in degrees centigrade.

EXAMPLE 1

100 kilograms of zinc oxide (commercial zinc white) are admixed, in a mixer, with 50 liters of aqueous ammonium bicarbonate solution, saturated at 15°, and with 40 kilograms of solid ammonium bicarbonate, for 45 minutes. The product thus obtained is shaped to desired form and is dried, after the mass has set in air. It contains 92% of $ZnCO_3$ and 8% of $Zn(OH)_2$, and its theoretical absorption capacity is about 250 grams of sulfur per kilogram. Brought into contact with a gas containing about 3 grams of sulfur, as hydrogen sulfide, per cubic meter at a temperature of 300–400° and at a spatial velocity of 1000, the first traces of hydrogen sulfide appear in the gases being treated when the mass has fixed 60% of the theoretical quantity or 150 grams of sulfur per kilogram. Saturation of the product corresponds practically to the theoretical absorption capacity. The desulfurization yield is thus very close to 100%.

By way of comparison, the same zinc oxide, not treated according to the present invention, when used for the desulfurization of the same industrial gas under otherwise identical conditions no longer absorbs hydrogen sulfide as soon as its sulfur content amounts to 50 grams per kilogram, whereas its theoretical capacity is 390 grams per kilogram.

Extended carbonatation of the metallic oxides is not advantageous because, apart from the supplemental consumption of ammonium bicarbonate, the final product has the disadvantage of a very low apparent density and a very limited gain in absorption capacity; see the following example. This is explained by the fact that in the case of an incomplete carbonatation, the non-carbonated oxide particles are sufficiently dispersed in the mass of carbonate so that their activity is very appreciable.

EXAMPLE 2

100 kilograms of zinc oxide coming from a sulfurized absorbent mass, after calcination and comminution, are admixed for 90 minutes at ambient temperature with about 50 liters of saturated aqueous ammonium bicarbonate solution and 20 kilograms of solid ammonium bicarbonate. The resultant paste is used as in the preceding example.

The dry product comprises 62% of $ZnCO_3$, 5% of $Zn(OH)_2$ and 23% of ZnO. Brought into contact with the same gas to be desulfurized as in the preceding example, at a temperature of 300–400° and at a spatial velocity of 1000, it absorbs all the sulfur of the gas. The first traces of $H_2S$ appear when the mass contains about 110 grams of sulfur per kilogram. Saturation is reached for a content of 240 grams per kilogram, the theoretical absorption being 305 grams of sulfur per kilogram of purifying mass. The desulfurization yield is 78%. This example shows that zinc oxide prepared according to the present invention starting from a sulfurized mass, regenerated and comminuted, has an activity comparable to that obtained when starting with the fresh oxide of Example 3.

EXAMPLE 3

100 kilograms of commercial zinc oxide are admixed at ambient temperature with 45 liters of saturated aqueous ammonium bicarbonate for 90 minutes, in a $CO_2$ atmosphere. The so-obtained paste is shaped into desired form, e.g. by means of a suitably configurated press, and the products are dried in air or by stoving, after having been allowed to rest for 2 hours in order to set. The product contains 28% zinc carbonate, 2% zinc hydroxide and 70% zinc oxide.

The absorber is charged with these products, e.g. in granule form, and there is then passed therethrough at 300–400° and at a spatial velocity of 1000 a gas to be desulfurized containing an average of 3 grams of sulfur, in the form of hydrogen sulfide, per cubic meter. The treated gas contains no trace of sulfur impurities at the outlet of the absorber. When the purifying mass has fixed 140 grams of sulfur per kilogram of absorbent, small quantities of $H_2S$ appear at the outlet. Saturation is practically attained when the content of sulfur in the mass is about 240 grams per kilogram. The theoretical absorption capacity being about 355 grams of sulfur per kilogram, the desulfurization yield is about 67%.

EXAMPLE 4

100 kilograms of commercial zinc oxide are admixed with 38 liters of water in a $CO_2$ atmosphere for 150 minutes. The resultant paste is treated as in the foregoing examples and the final product, utilized under the identical conditions. The composition corresponds to the following: $ZnCO_3=15\%$, $ZnO=85\%$ and its theoretical absorption capacity is about 378 grams of sulfur per kilogram. The gas being treated contains the first traces of hydrogen sulfide when the absorbent mass has already fixed 90 grams of sulfur per kilogram, and saturation is already reached for a content of 180 grams per kilogram. The desulfurization yield is about 48%.

EXAMPLE 5

100 kilograms of commercial cadmium oxide and 30 kilograms of ammonium carbonate are introduced into a mixer. The kneaded mixture is pastified by the addition of water (about 10 kilograms). After a 20 minute mixing period, the resultant pasty mass is converted into the form of small cylinders, in an appropriate extrusion apparatus. The so-obtained catalyst is useful, after being dried in air and/or by heating, for example in the conversion of acetic acid into acetone with a yield of 92% at 350° and at a spatial velocity of 400, the residual 8% consisting principally of unreacted acetic acid.

Auxiliary substances, such as promoters, may be incorporated into the mass being mixed, if desired.

EXAMPLE 6

Magnesium oxide is chemically rather inert. It is often employed as a catalyst support and is utilized in certain cases as an agglomerant for active products. The preparation of products which are active and which present a particularly large interior surface can be realized by the present invention.

(a) Preparation of catalysts on MgO support

It is possible, by the process of the present invention, to prepare numerous catalysts on an MgO base, the catalytic element proper of which can be widely varied (nickel, cobalt, copper, etc.).

For instance, to prepare a hydrogenation catalyst with a nickel-magnesium oxide base, containing $x\%$ of Ni, 100 kilograms of commercial magnesium oxide, 40 kilograms of ammonium bicarbonate and 15 liters of a solution of a soluble nickel salt, such e.g. as the nitrate, sulfate, acetate, etc. containing the desired quantity of active element, are kneaded together in a mixing machine. This operation lasts for about 20 minutes. The so-obtained paste is converted into the desired physical form (pellets or the like), dried in air or by storing, then heated to 300° to decompose the formed magnesium carbonate.

The invention also makes it possible to prepare more complex catalysts comprising several active elements. To this end, these elements—in the form of solutions of soluble salts thereof—are incorporated into the mixture to be kneaded, according to the preceding paragraph, the procedure of which is otherwise repeated.

The so-obtained catalysts contain the oxide or oxides of the catalytic metal or metals in highly dispersed state in an extremely porous support. In fact, since the magnesium carbonate is decomposed at rather low temperatures—below 600°—in order to maintain the structure of the carbonate, the density of the oxide thus obtained is about 1.5, whereas the density of cubic MgO is about 3.6. Finally, the mechanical resistance of the obtained products enables them to withstand various handling operations and the mechanical forces to which they are subjected in the course of their utilization.

(b) Preparation of MgO agglomerated catalysts

In certain cases, the active product constitutes the largest part of the catalyst, and it is necessary to resort to an agglomerant in order to produce a desired granulometric product of sufficient mechanical strength.

For example, to prepare an iron oxide catalyst for use in the conversion of carbon monoxide by means of steam, 170 kilograms of commercial magnesium oxide (magnesia) are admixed with 830 kilograms of precipitated iron oxide, alone or together with any desired activators, and with 130 kilograms of ammonium bicarbonate and about 100 kilograms of water.

The pasty mass obtained after 40 minutes of mixing is converted for example into granule form, and then dried in the air or by storing.

The resultant catalyst when for example brought into contact at 400–410° C. and at a spatial velocity of 500 with a gas of the following approximate composition:

| | Percent by weight |
|---|---|
| $CO_2$ | 6.6 |
| CO | 41.2 |
| $H_2$ | 31.0 |
| $N_2$ | 21.2 | in admixture with a quantity of superheated steam sufficient to satisfy the ratio $$\frac{(H_2O)}{(CO)}=3$$

will produce a gas which, after condensation of excess water vapor, contains:

| | Percent by weight |
|---|---|
| $CO_2$ | 32.0 |
| $CO$ | 2.1 |
| $H_2$ | 50.7 |
| $N_2$ | 15.2 |

In manner similar to that set forth in the preceding examples, it is also possible to prepare highly dispersed oxides of beryllium, calcium, strontium, barium, etc.

It must be well understood that we mean by "commercial zinc oxide," in the hereinbefore specification, the present commercial product which is obtained by oxidation of zinc vapours leaving the retorts where zinc ores are being distilled.

Having thus disclosed the invention, what is claimed is:

1. A process for the conversion of an oxide of a metal of the second group of the periodic system in a form of reduced activity into the highly active form of the oxide, which comprises reacting the commercial oxide in the form of an aqueous paste and at atmospheric pressure with ammonium bicarbonate, whereby carbonatation of the metal takes place in the presence of liberated $NH_3$ as carbonatation catalyst, then converting the obtained still-plastic mass to desired configuration, allowing the configured material to harden in air and then drying the hardened product, and finally heating the latter whereby decarbonation takes place with liberation of highly dispersed and highly active metal oxide.

2. A process for the preparation of zinc oxide of a high degree of dispersion and activity from relatively inactive zinc oxide, which comprises reacting commercial zinc oxide in the form of an aqueous paste and at atmospheric pressure with ammonium bicarbonate, whereby carbonatation of the zinc takes place in the presence of liberated $NH_3$ as carbonatation catalyst, then converting the obtained still-plastic mass to desired configuration, allowing the configured material to harden in air and then drying the hardened product, and finally heating the latter whereby decarbonation takes place with with liberation of highly dispersed and highly active zinc oxide.

3. A process according to claim 2, wherein the first-named reaction step is carried out in the absence of carbon dioxide.

4. A process according to claim 2, wherein the first-named reaction step is carried out in the presence of carbon dioxide.

5. A process for the preparation of zinc oxide of a high degree of dispersion and activity from relatively inactive zinc oxide, which comprises reacting commercial zinc oxide in the form of an aqueous paste and at atmospheric pressure with a solution of aqueous ammonia in the presence of carbon dioxide, whereby carbonatation of the zinc takes place in the presence of liberated $NH_3$ as carbonatation catalyst, then converting the obtained still-plastic mass to desired configuration, allowing the configured material to harden in air and then drying the hardened product, and finally heating the latter whereby decarbonation takes place with liberation of highly dispersed and highly active zinc oxide.

6. A process according to claim 2, wherein the zinc oxide being treated is zinc oxide which has been employed for the absorption of hydrogen sulfide from industrial gases, and has been calcined and comminuted.

7. A process according to claim 1 wherein the oxide being treated is magnesium oxide.

8. A process according to claim 1 wherein the oxide being treated is cadmium oxide.

9. A process for the conversion of an oxide of a metal of the second group of the periodic system in a form of reduced activity into highly active oxide, which process comprises partially carbonating commercial oxide in the form of an aqueous paste and at atmospheric pressure with ammonium bicarbonate, shaping the resulting plastic mass, air-hardening the shaped mass, drying the hardened product, and decarbonating the hardened product by heating same until highly dispersed and highly active metal oxide is obtained.

References Cited in the file of this patent

UNITED STATES PATENTS

| 654,804 | Rigg | July 31, 1900 |
| 1,898,405 | Svendsen | Feb. 21, 1933 |
| 2,105,394 | Allavena | Jan. 11, 1938 |
| 2,372,367 | Depew | Mar. 27, 1945 |
| 2,898,191 | Conn et al. | Aug. 4, 1959 |

OTHER REFERENCES

Mellor: "Comprehensive Treatise on Inorganic and Theoretical Chemistry," Longmans, Green and Co., N.Y., 1923, vol. 4, pages 351 and 518, 647.